(12) United States Patent
Garg et al.

(10) Patent No.: US 11,985,563 B2
(45) Date of Patent: *May 14, 2024

(54) ENHANCEMENT FOR MULTIPLE SECONDARY CELL GROUP FAILURES

(71) Applicant: Apple Inc., Cupertino, CA (US)

(72) Inventors: Nihar Garg, Jersey City, NJ (US); Ehsan Ahmed Quadri Syed, Jersey City, NJ (US); Karthik Anantharaman, Cupertino, CA (US); Mohamed L. Haidara, Jersey City, NJ (US); Shashikant Tiwari, Jersey City, NJ (US); Sree Ram Kodali, Sunnyvale, CA (US); Sridhar Prakasam, Fremont, CA (US); Vijay Venkataraman, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/951,542

(22) Filed: Sep. 23, 2022

(65) Prior Publication Data
US 2023/0013274 A1    Jan. 19, 2023

Related U.S. Application Data

(63) Continuation of application No. 16/952,435, filed on Nov. 19, 2020, now Pat. No. 11,490,312.

(51) Int. Cl.
*H04W 36/30*    (2009.01)
*H04W 36/00*    (2009.01)

(52) U.S. Cl.
CPC ....... *H04W 36/30* (2013.01); *H04W 36/0079* (2018.08)

(58) Field of Classification Search
None
See application file for complete search history.

(56) References Cited

U.S. PATENT DOCUMENTS 10,212,619 B2  2/2019  Singhal
10,237,841 B1  3/2019  Krishnamurthy
(Continued)

FOREIGN PATENT DOCUMENTS

CN    110461013 A    11/2019
CN    112369057 A    2/2021
(Continued)

*Primary Examiner* — Rafael Perez-Gutierrez
*Assistant Examiner* — Frank E. Donado
(74) *Attorney, Agent, or Firm* — Kowert, Hood, Munyon, Rankin & Goetzel, P.C.

(57) ABSTRACT

Embodiments are presented herein of apparatuses, systems, and methods for mitigation of secondary cell failures. A user equipment (UE) may establish communication with a macro cellular base station. The UE may perform a signal quality measurement of a small cell base station and compare the signal quality measurement to a threshold. Based on the signal quality measurement exceeding the threshold, the UE may attempt to additionally connect to the small cell base station. In response to a radio link failure of the second base station, the UE may modify the first threshold. In response to subsequent failures to additionally connect to the small cell base station using the modified first threshold, the UE may disable connections to the small cell base station.

18 Claims, 10 Drawing Sheets

(56) References Cited

U.S. PATENT DOCUMENTS

| | | | |
|---|---|---|---|
| 10,548,056 B1 | 1/2020 | Sung | |
| 11,026,138 B1 | 6/2021 | Marupaduga | |
| 11,134,530 B1 | 9/2021 | Marupaduga | |
| 2020/0100181 A1 | 3/2020 | Jia | |
| 2020/0154287 A1* | 5/2020 | Novlan | H04L 5/0075 |
| 2020/0314942 A1 | 10/2020 | Bai | |
| 2021/0251029 A1* | 8/2021 | Sanders | H04W 36/0069 |
| 2022/0086670 A1* | 3/2022 | Kim | H04W 76/20 |
| 2022/0174769 A1* | 6/2022 | Hong | H04W 48/20 |
| 2022/0394583 A1* | 12/2022 | Deenoo | H04W 74/0841 |
| 2023/0164867 A1* | 5/2023 | Cheng | H04W 36/0069 370/252 |

FOREIGN PATENT DOCUMENTS

| | | |
|---|---|---|
| CN | 112954730 A | 6/2021 |
| WO | 2019158336 | 8/2019 |

* cited by examiner

ENHANCEMENT FOR MULTIPLE SECONDARY CELL GROUP FAILURES

PRIORITY CLAIM

This application is a continuation of U.S. patent application Ser. No. 16/952,435, entitled "Enhancement for Multiple Secondary Cell Group Failures," filed Nov. 19, 2020, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless devices, and more particularly to apparatuses, systems, and methods for handling multiple secondary cell group failures.

DESCRIPTION OF THE RELATED ART

Wireless communication systems are rapidly growing in usage. Wireless devices, particularly wireless user equipment devices (UEs), have become widespread. Additionally, there are a variety of applications (or apps) hosted on UEs that perform or depend on wireless communication, such as applications that provide messaging, email, browsing, video streaming, short video, voice streaming, real-time gaming, or various other online services.

Increased reliability in these communication systems are desirable.

SUMMARY

Embodiments are presented herein of apparatuses, systems, and methods for enhancement for multiple secondary cell group failures, e.g., by a user equipment device (UE).

A user equipment (UE) may establish communication with a macro cellular base station. The UE may perform a signal quality measurement of a small cell base station and compare the signal quality measurement to a threshold. Based on the signal quality measurement exceeding the threshold, the UE may attempt to connect to the small cell base station. In response to a radio link failure of the second base station, the UE modify the first threshold. In response to subsequent failures to connect to the small cell base station using the modified first threshold, the UE may disable connections to the small cell base station.

In some embodiments, a non-transitory memory medium may include program instructions executable by a UE that, when executed, cause the UE to perform at least a portion or all of the above operations. In some embodiments, a method performed by the UE may include the UE performing the above operations. In some embodiments, a method performed by a base station or network element may include the base station or network element performing corresponding operations.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed embodiments can be obtained when the following detailed description is considered in conjunction with the following drawings, in which.

Figure 1:
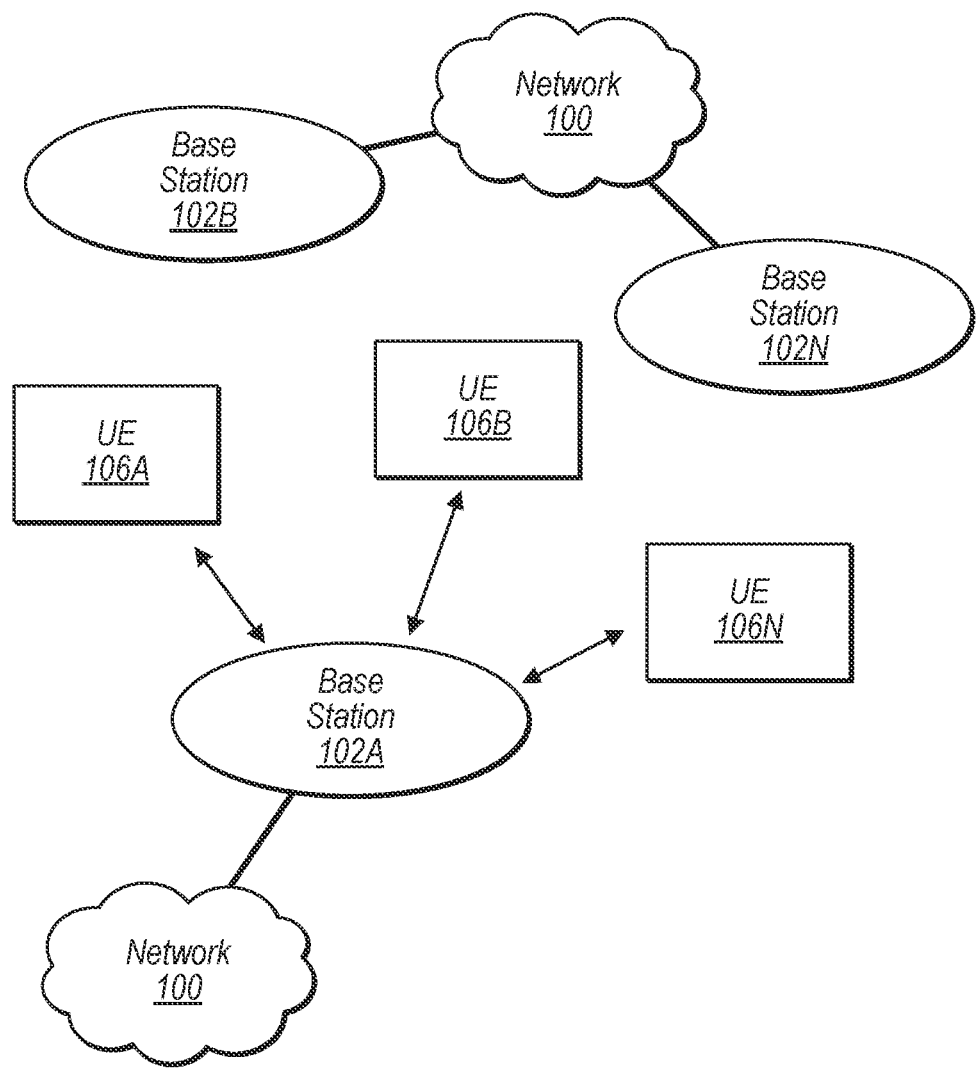
FIG. 1 illustrates an example wireless communication system, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present Patent Application:

UE: User Equipment
BS: Base Station
ENB: eNodeB (Base Station)
LTE: Long Term Evolution
UMTS: Universal Mobile Telecommunications System
RAT: Radio Access Technology
RAN: Radio Access Network
E-UTRAN: Evolved UMTS Terrestrial RAN
CN: Core Network
EPC: Evolved Packet Core
MME: Mobile Management Entity
HSS: Home Subscriber Server
SGW: Serving Gateway
PS: Packet-Switched CS: Circuit-Switched
EPS: Evolved Packet-Switched System
RRC: Radio Resource Control
IE: Information Element
QoS: Quality of Service
QoE: Quality of Experience
TFT: Traffic Flow Template
RSVP: Resource ReSerVation Protocol
API: Application programming interface Terms The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, Play Station Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Figure 2:
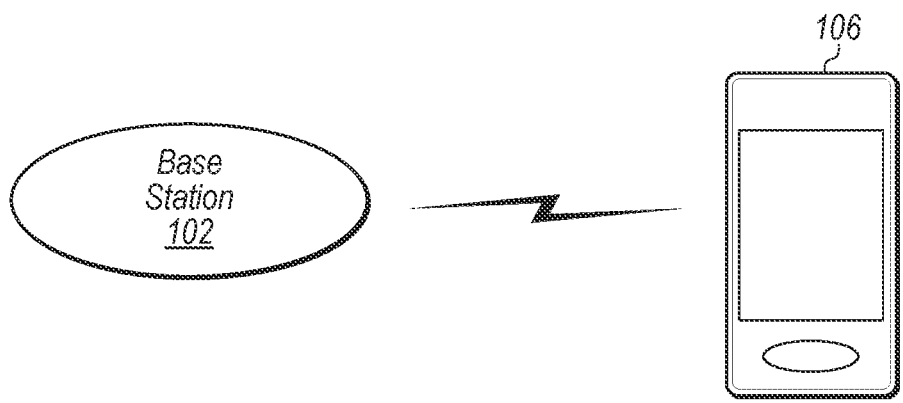
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), 6G, HSPA, 3GPP2 CDMA2000 (e.g., 1xRTT, 1xEV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as 'gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTTor LTE or GSM), and separate radios for communicating using each of Wi-Fi and Bluetooth. Other configurations are also possible.

Figure 3:
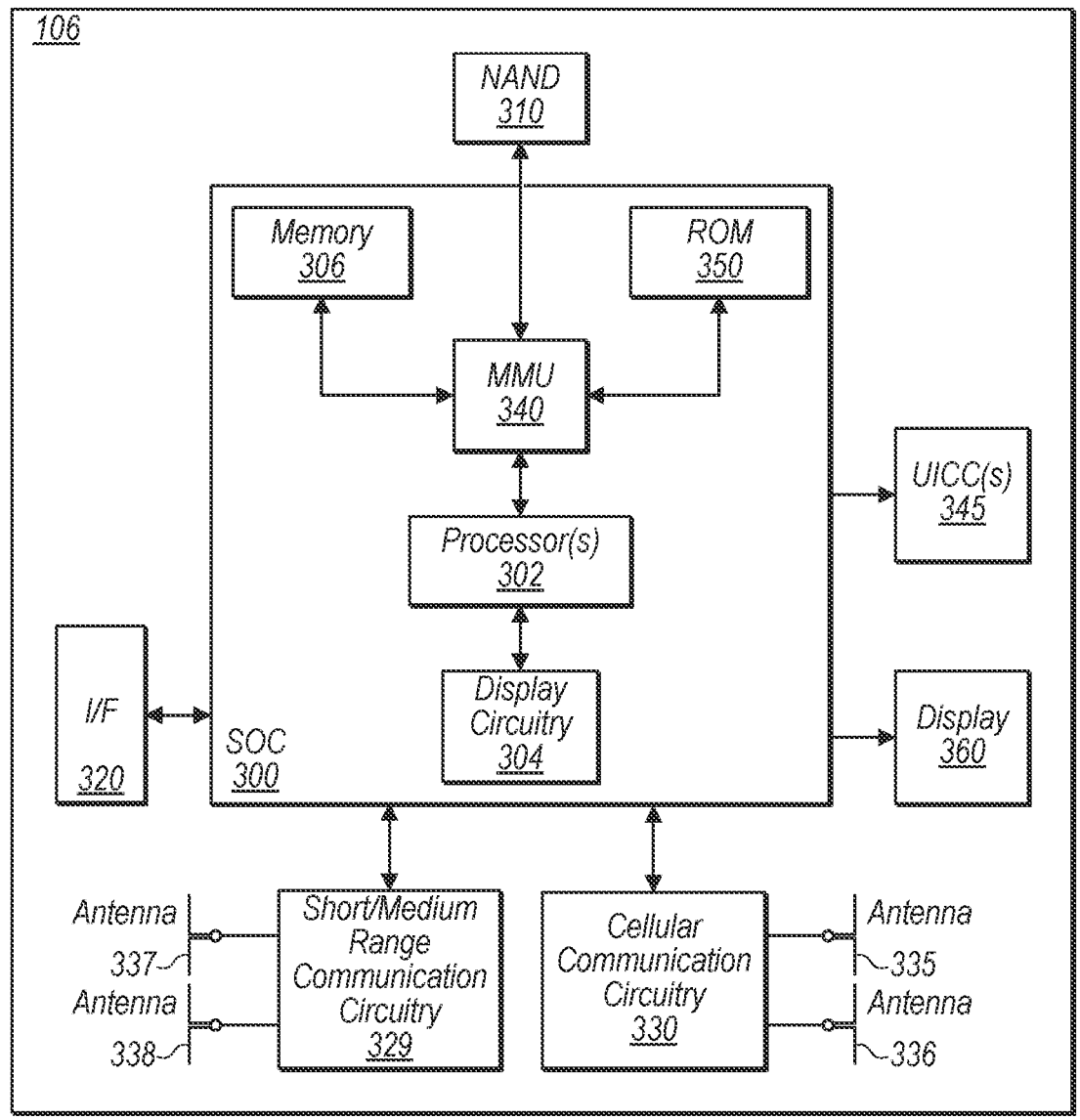
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using multiplexing to perform transmissions according to multiple radio access technologies in the same frequency carrier (e.g., and/or multiple frequency carriers), as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements and/or processors. In other words, one or more processing elements or processors may be included in cellular communication circuitry 330 and, similarly, one or more processing elements or processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
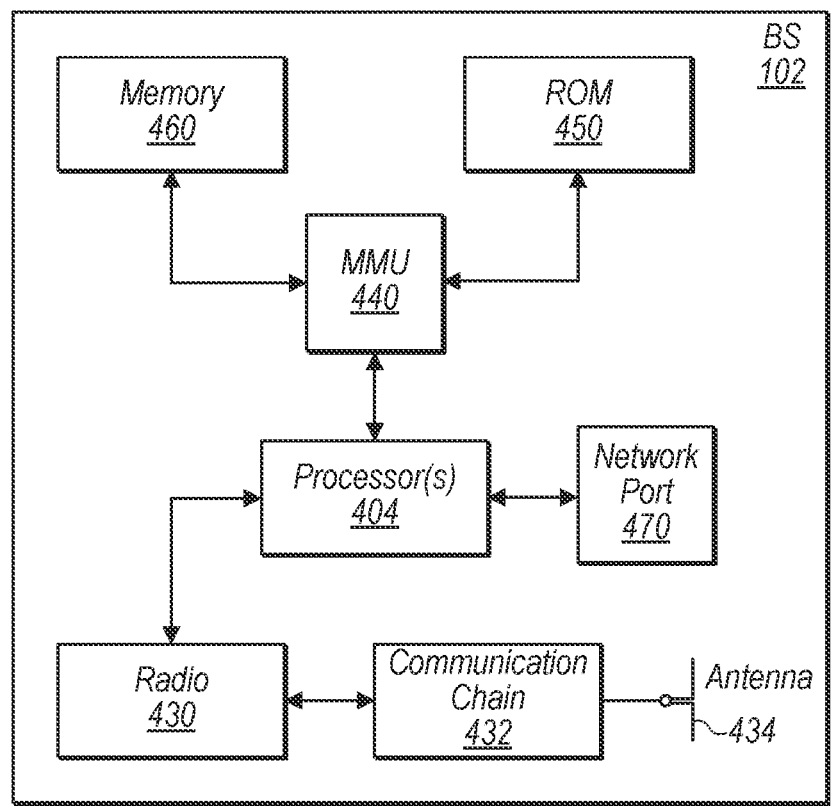
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The radio 430 and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
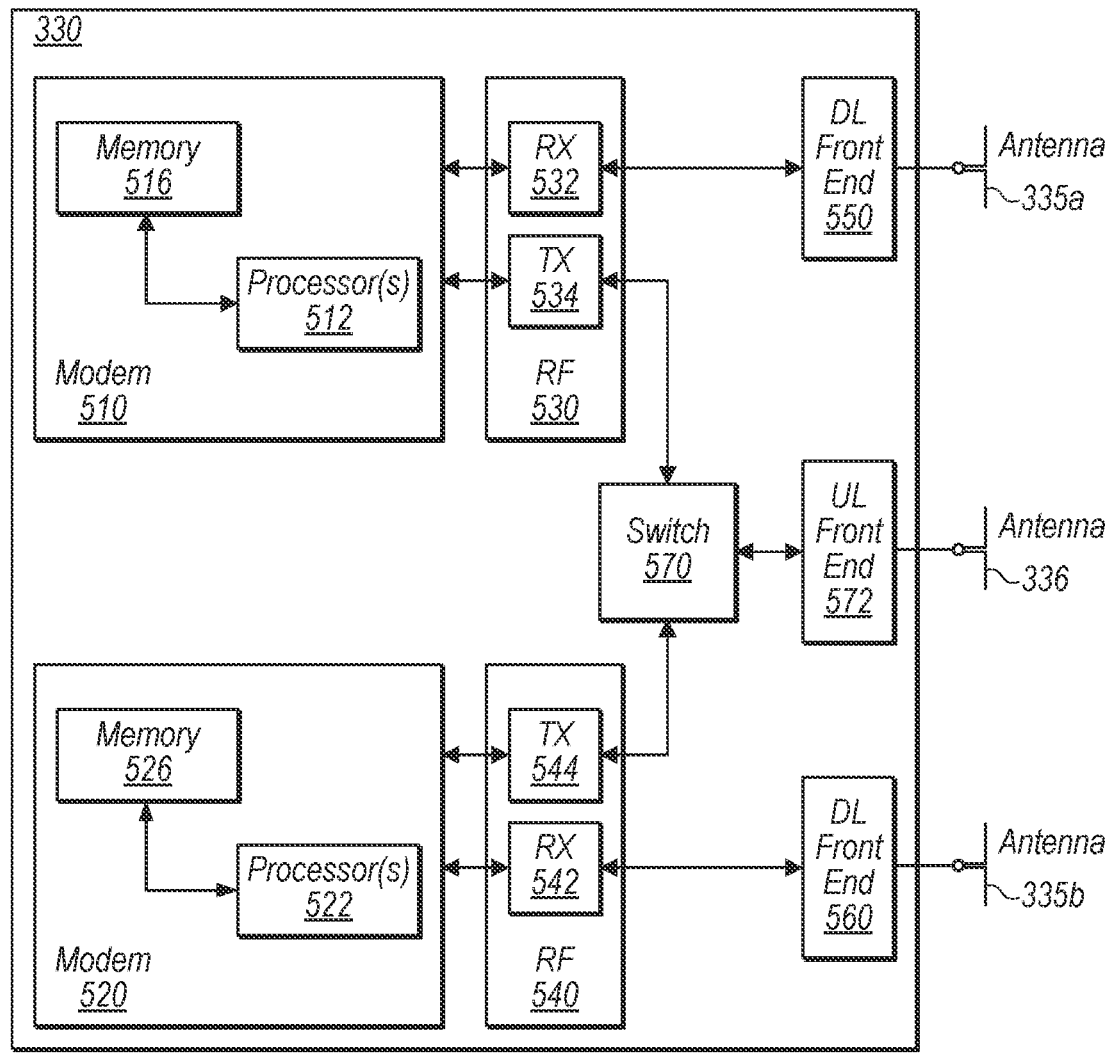
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In some embodiments, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC, or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s) 512, 522, etc. In addition, each integrated circuit may include circuitry (e.g., first circuitry, second circuitry, etc.) configured to perform the functions of processor(s) 512, 522, etc.

As described herein, the modem 520 may include hardware and software components for implementing features for using multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

Figure 6:
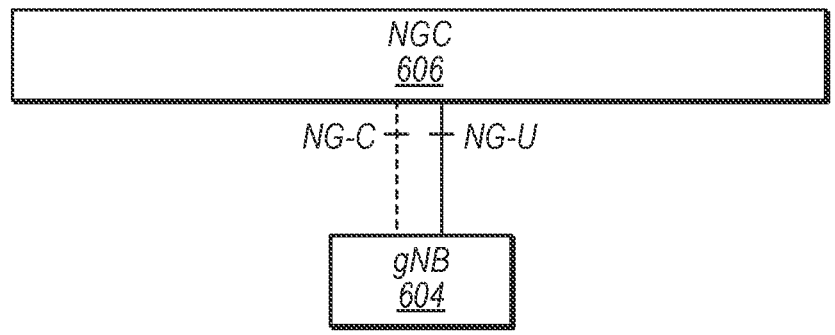
FIGS. 6 and 7 illustrate examples of a 5G NR base station (gNB), according to some embodiments.
Figure 7:
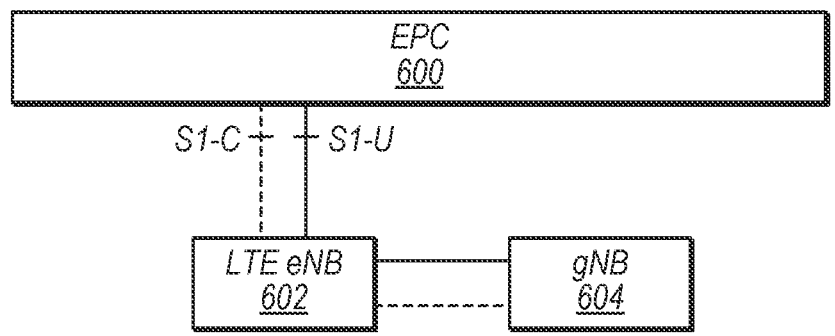

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Figure 8:
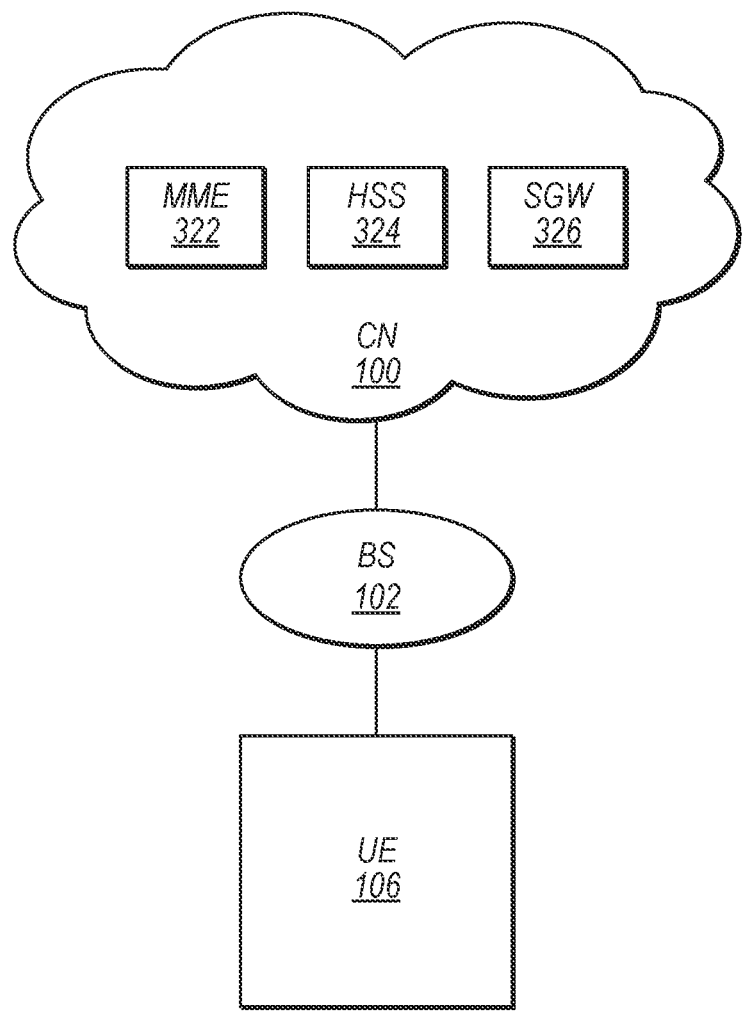
FIG. 8 illustrates an exemplary wireless network in communication with a UE, according to some embodiments.

FIG. 8—Wireless Communication System

FIG. 8 illustrates an example simplified portion of a wireless communication system. The UE 106 may be in communication with a wireless network, e.g., a radio access network (RAN), which may include one or more base stations (BS) 102 and may provide connection to a core network (CN) 100, such as an evolved packet core (EPC). The base station 102 may be an eNodeB and/or gNB (e.g., a 5G or NR base station) or other type of base station. The UE 106 may communicate in a wireless manner with the base station 102. In turn, the base station 102 may be coupled to a core network 100. As shown, the CN 100 may include a mobility management entity (MME) 322, a home subscriber server (HSS) 324, and a serving gateway (SGW) 326. The CN 100 may also include various other devices known to those skilled in the art.

Operations described herein as being performed by the wireless network may be performed by one or more of the network devices shown in FIG. 8, such as one or more of the base station 102 or the CN 100, and/or the MME 322, HSS 324, or SGW 326 in the CN 100, among other possible devices. Operations described herein as being performed by the radio access network (RAN) may be performed, for example, by the base station 102, or by other components of the RAN usable to connect the UE and the CN.

Secondary Cell Failure Enhancement

Figure 9:
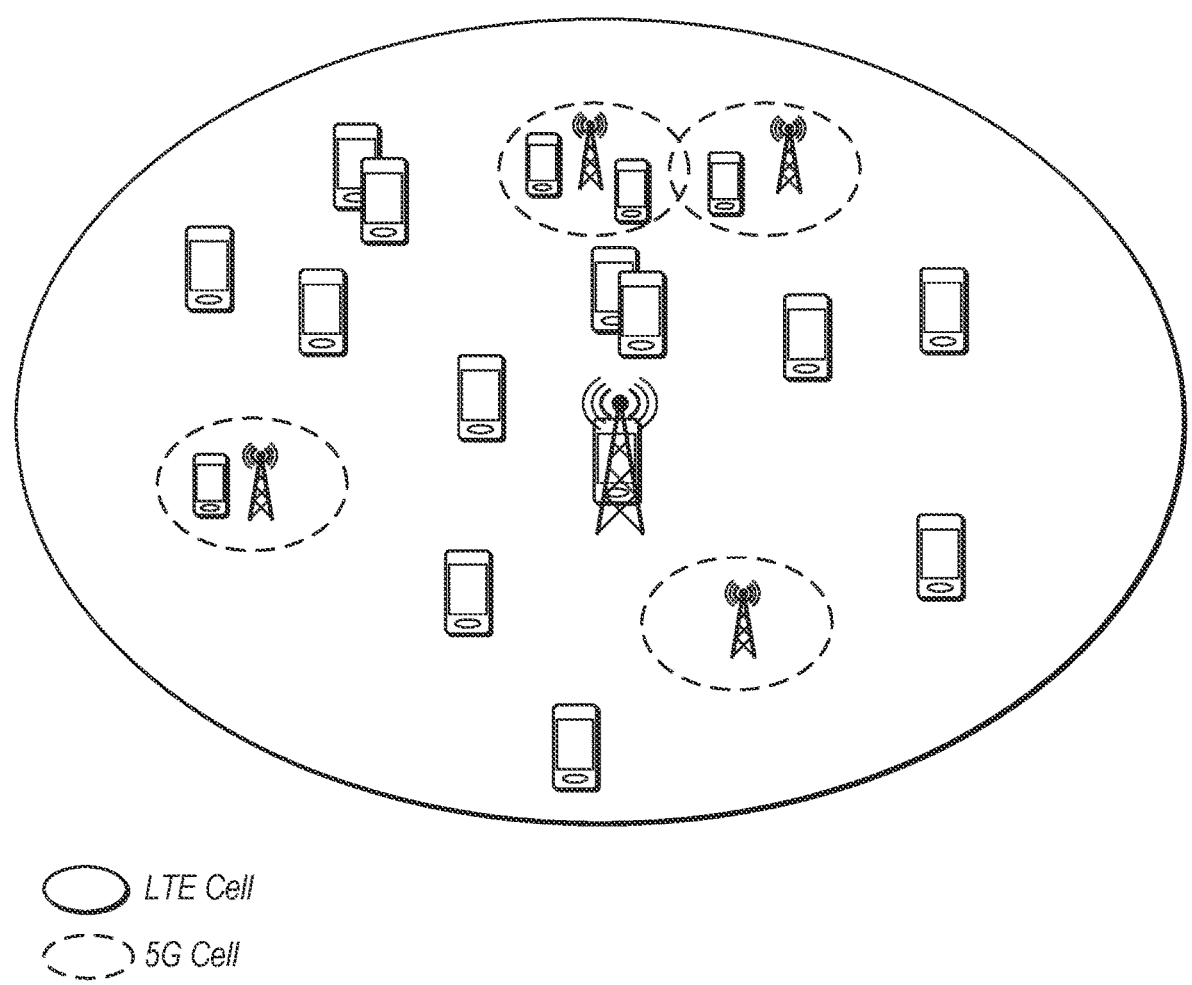
FIG. 9 is a diagram illustrating an example cell coverage scenario for LTE and NR, according to some embodiments.

FIG. 9 illustrates an example cellular environment where multiple UEs are within the range of an LTE cell (e.g., which may be part of a master cell group (MCG)). Within the LTE cell, multiple smaller cells (e.g., 5G or NR cells) may be available for providing connectivity to UE(s). The smaller cells may be secondary cells or part of a secondary cell group (SCG).

UEs in such an environment may experience secondary cell failure(s). In some cases, there may be a failure loop where a UE experiences a secondary cell failure for a small cell (e.g., a 5G or NR cell, among other possibilities) and the network continues to configure the UE to communicate with a secondary cell (e.g., the same secondary cell or a different one), which may result in additional failures.

For example, the UE may perform signal quality measurements of a secondary cell (e.g., RSRP or any other signal quality metric) and may compare the signal quality measurement to a threshold. If it exceeds the threshold, the UE may be configured or instructed (e.g., by the base station, such as the LTE or master cell in the example of FIG. 9) to connect to the secondary cell. Then, the UE may attempt to connect, but experience failure, even though the cell measurement is above the threshold. If the UE continues to report measurement values above the threshold, the UE may be configured to (or instructed to) attempt to connect again, and continue to fail.

Exemplary reasons for secondary cell radio link failure (RLF) may include any of the following:

Expiry of time T310 in primary secondary cell (Pscell): if RLF occurs because of T310 expiry, then the UE may trigger SCG failure with failureType as t310-Expiry. The UE may start the T310 timer upon receiving N310 consecutive "out-of-sync" indications from lower layer and stops this upon receiving N311 consecutive "in-sync" from lower layer before expiry of this timer.

RACH problem indication, e.g., from SCG medium access control (MAC): If RLF occurs due to RACH problem, then failureType may be set as randomAccessProblem.

Max radio link control (RLC) Re-Tx (retransmissions) reached: In this case, failure type is rlc-MaxNumRetx. In this case, SCG is triggered upon reaching a threshold number of RLC retransmissions.

These multiple failures (for any particular reason, including those above) may cause one or more impacts for the UE and/or network, e.g., excessive over the air (OTA) signaling, low data throughputs, data stalls (e.g., on NR and/or LTE), battery consumption, unstable Alpha Tag (e.g., network label), etc.

FIG. 10

Figure 10:
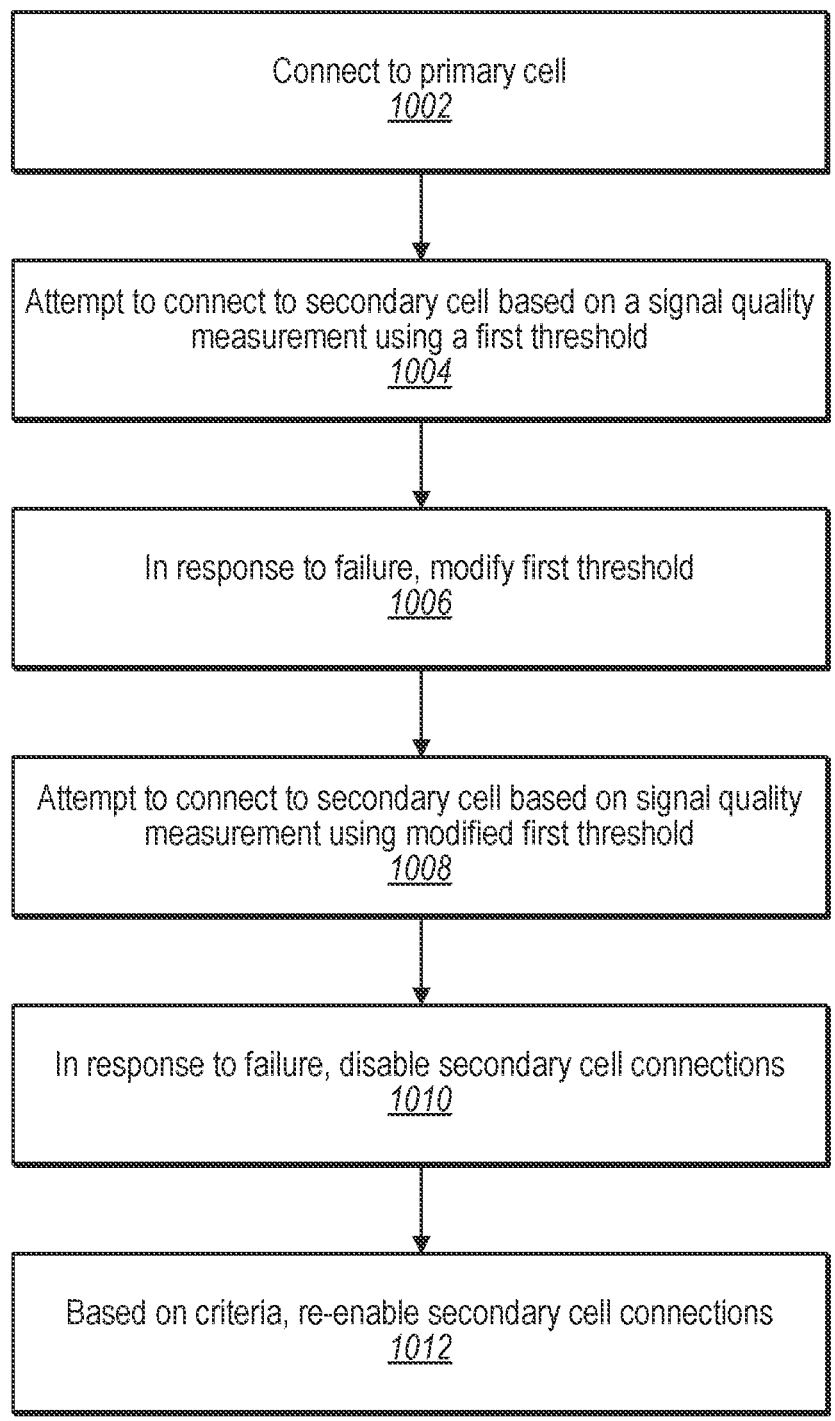
FIGS. 10, 11A, and 11B are flow chart diagrams illustrating example methods for beam failure detection, according to some embodiments.

FIG. 10 illustrates exemplary techniques for secondary cell failure enhancement. Note that while FIG. 10 may refer to secondary cells or a secondary cell group, the embodiments may apply to small cells, NR cells, etc. Aspects of the method of FIG. 10 may be implemented by a wireless device, such as the UE(s) 106, in communication with a network, e.g., via one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 302, baseband processor(s), processor(s) associated with communication circuitry, etc., among various possibilities) may cause the UE to perform some or all of the illustrated method elements. Similarly, one or more processors (or processing elements) of the BS (e.g., processor(s) 404, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

In 1002, a UE (e.g., UE 106) may establish communication with a network (e.g., via base station 102), according to some embodiments. For example, the UE may perform an attach procedure with a first base station, e.g., a primary cell. In some embodiments, the first base station may be a macro cellular base station (e.g., an LTE base station) and/or may be in a master cell group (MCG). In some embodiments, the UE may provide capability information to the base station. For example, the UE may indicate that the UE is capable of performing LTE and NR/5G communication. Additionally, the capability information may include various MIMO capabilities, number of available antennas, number of available ports, coherency (e.g., non-coherent, partial coherent, full coherent), etc.

The UE may be configured (e.g., based on signaling from the network and/or first base station) to perform signal quality measurements of neighbor base stations (e.g., including small cells, such as 5G/NR cells). In some embodiments, the UE may compare signal quality metrics (e.g., RSRP, RSRQ, SNR, SINR, etc.) of a neighboring base station to a first threshold. The first threshold (e.g., a B1 threshold) may be indicated in signaling from the base station, e.g., in one or more messages transmitted by the base station. In some embodiments, the UE may be configured to transmit a measurement report when a neighboring base station (e.g., a small cell) is above the first threshold (e.g., a B1 threshold). In response, the network (e.g., the first base station) may indicate that the UE should add the neighboring base station. Alternatively, the UE may be configured to perform addition without instruction from the network (e.g., the first base station) upon measuring a signal quality metric over the first threshold. In some embodiments, rather than addition, the network and/or UE may determine to perform handover to the neighboring base station.

In 1004, the UE may attempt to connect to a second base station or secondary cell based on the signal quality measurement being above the first threshold. As noted above, the UE may perform the connection attempt autonomously or in response to the network (e.g., the first base station) instructing the UE to perform addition, e.g., based on a measurement report indicating the signal quality measurement. Connecting to the secondary cell may be in addition to the connection to the first base station. Accordingly, in the case of a successful connection to the second base station, the UE may be connected to and/or communicating with both of the first base station and the second base station, e.g., simultaneously (at the same time) or concurrently.

In 1006, in response to a failure to establish connection with the secondary cell, the UE may modify the first threshold, e.g., using an offset. In some embodiments, the first threshold may be a B1 threshold and the offset may be a B1 offset. The value of the offset may be added to the first threshold (e.g., the B1 threshold) configured by the network. This offset may allow the UE to avoid or delay handoff, e.g., by avoiding or delaying sending the measurement report to the first base station.

In some embodiments, the offset may be a static variable. Alternatively, the offset may be a dynamic variable, based on multiple factors, such as those discussed below:

In some embodiments, the offset value may be based on the value of the first threshold (e.g., configured by the network). For example, if the threshold is already very stringent e.g., 61 (−95 dBm), the offset may be used (e.g., lowered) to restrict the UE from disregarding the secondary cell. On the other hand, if the threshold is not as stringent, e.g., is around 45-50 (−111 to −106 dBm), then the offset may be higher, which may improve the performance of the UE.

In some embodiments, the offset can be varied based on the antenna efficiency of the band combo being used. For example, B41+n41 combo may have a better antenna efficiency than B2+n71 or B66+n71, and may not need a higher B1Offset value.

In some embodiments, the offset can be varied based on the frequency range (e.g., frequency range 1 (FR1) or frequency range 2 (FR2)). For example, a higher offset may be used for FR2 as FR2 performance is coverage dependent. Additionally, or alternatively, the offset may be based on the antenna panel (e.g., used in FR2). For example, if 1×4 panel is in use, the offset can be set to a higher value, because higher order antenna panel performance is much better than a lower order panel.

In some embodiments, the value of the offset may be determined based on a combination of factors. For example, the following formula may be used, although other variations are envisioned:

$$B1Offset = a(B1) + b(\text{Antenna Efficiency}) + c(FR1/FR2) + d(\text{Antenna Panel in use})$$

where, a, b, c & d are different weightage values given to each factor.

In 1008, the UE may attempt to connect to a secondary cell (e.g., the same secondary cell in 1004 or a different secondary cell) using the modified first threshold (e.g., the first threshold modified by the offset). For example, the UE may perform a signal quality measurement of the secondary cell and compare the signal quality measurement to the modified first threshold. In response to the measurement being above the modified first threshold, the UE may attempt to connect to the secondary cell (e.g., autonomously or in response to instructions from the network after providing a measurement report indicating the measurement). The UE may not be configured to attempt to the secondary cell and/or provide a measurement report if the measurement is below the modified first threshold, even if it is above the original first threshold.

In 1010, in response to one or more failures to connect to a secondary cell (e.g., the same secondary cell or multiple secondary cells of the same type, such as NR secondary cells or small secondary cells), the UE may be configured to disable secondary cell connections (or small cell connections or NR cells).

In some embodiments, the UE may implement a counter to track a number of secondary cell failures and disabling secondary cell connections based on the counter reaching a threshold value (e.g., a secondary cell failure counter threshold). The secondary cell failure counter threshold could be any of various values, e.g., 1, 2, 4, 5, etc. depending on the embodiment or implementation. Thus, in one embodiment, when the secondary cell failure counter reaches the threshold value, the UE may be configured to disable secondary cell connections.

In some embodiments, the counter may be incremented for any secondary cell failure. Alternatively, or additionally, the counter may be specific to a type of secondary cell (e.g., a small cell or NR cell). As another possibility, respective counters may be used for individual secondary cells, e.g. independent of other secondary cells.

In some embodiments, one or more timers may be used in association with the counter. For example, a first timer (t1) may be used to track the time between two consecutive secondary cell failures. Accordingly, in one embodiment, the counter may only be incremented when a secondary cell failure occurs within the first timer length. Said another way, the first timer may keep track of the time between two consecutive secondary cell failures, and the counter may be raised only if the next secondary cell failure occurs within the first timer.

Disabling secondary cell connections may be implemented in any of a variety of manners. In some embodiments, the UE may simply disable attempting connections to certain secondary cells, e.g., all secondary cells, all NR cells, all small cells, etc. Alternatively, or additionally, the UE may simply stop measuring these cells. As another possibility, the UE may stop sending measurement reports to the network for those cells or simply raise the first threshold (e.g., via the offset) to a value so high that no secondary cell can qualify.

In some embodiments, the UE may update its capability information with the network to disable connections or handover commands to secondary cells. For example, the UE may provide access stratum layer signaling to the base station, e.g., by triggering a tracking area update (TAU) message and setting the UE capability change flag. Upon receiving a "UE capability enquiry" message form the network, the UE may modify certain parameters in the UE capability information message. For example, to disable 5G/NR, the UE may not include one or more information elements (IEs) in the UE capability information, such as: en-DC-r15 in IRAT-ParametersNR-r15, pdcp-ParametersNR-r15 in UE-EUTRA-Capability-v1510-IEs, and/or ue-Capability RAT-Container with RAT-type set to nr, among other possibilities. This RAN based solution may allow the UE to disable connections or handovers to secondary cell(s), e.g., without affecting the alpha tag; however, there is some possibility that there may be a disconnect between the first base station and the MME regarding the UE.

In some embodiments, the UE may update its capability information via non-access stratum layer (NAS) signaling, e.g., to the MME. For example, the UE may trigger a TAU message that updates the DCNR (dual connectivity with NR) bit to 0. In this embodiment, the MME may be aware of the updated UE capability so there is no disconnect between the first base station and the MME. However, it is possible this could have an impact on alpha tag.

In 1012, at a later time, the UE may re-enable secondary cell connections. Depending on the mechanism the UE used to disable secondary cell connections, it may re-enable in various manners. For example, if the UE had simply disabled its own reporting or connecting to secondary cells, the UE may allow it again. In some embodiments, if the UE has updated capability information to disable various parameter (s) (e.g., via RAN-based messaging), those parameter(s) may be re-enabled. In some embodiments, if the UE has transmitted NAS signaling to the MME, it may send another TAU message setting the DCNR bit to 1.

The UE may be configured to re-enable secondary cell connections based on a variety of different conditions or criteria. Any or all of the following conditions may be used:

In some embodiments, the UE may use a second timer (t2), which may be started when the UE disables the secondary cell connections. After expiry of the second timer, the UE may be configured to re-enable secondary cell connections. This time may be used to periodically check the 5G coverage and SCG Failures to see if conditions have changed.

In some embodiments, the UE may re-enable secondary cell connections at the start of any data session, e.g., from the idle mode. In one embodiment, this condition may only apply after t2 has expired. For example, after t2 expiry, the UE may remain in idle mode and may not attempt to connect to a secondary cell until a data session is started.

In some embodiments, the UE may re-enable secondary cell connections at the end of any data session.

In some embodiments, the UE may re-enable secondary cell connections based on a band, physical cell identity (PCI), and/or tracking area (TA) update, among other possibilities. For example, these updates may indicate that the device has moved and/or RF conditions may have changed.

In some embodiments, the UE may re-enable secondary cell connections based on a smart data mode input suggesting secondary cell use (e.g., 5G/NR use). For example, the smart data mode may determine to use NR based on various inputs, such as cell conditions and/or amount of data to be received or transmitted. Additionally, the smart data mode may be used to perform LTE communication to conserve battery power when NR is not needed. This condition may also only apply after t2 expiration.

In some embodiments, the UE may re-enable secondary cell connections in response to an out of service (OOS) or in-service transition.

In some embodiments, the UE may re-enable secondary cell connections in response to change in user grip (e.g., where the user is gripping the phone in a manner that is interfering with NR communication.

In some embodiments, the UE may re-enable secondary cell connections in response to a change in antenna panel (e.g., related to FR2 communications).

In some embodiments, the UE may re-enable secondary cell connections in response to a change in device orientation (e.g., as detected by various sensors in the UE, such as gyroscopic sensors).

In some embodiments, the UE may re-enable secondary cell connections in response to a change in motion state of the UE. The motion states of the UE may be stationary, pedestrian, moving, driving, etc. Changes in motion state may indicate that the conditions causing the secondary cell failures have passed, e.g., by the user moving from a poor location or stopping from moving in a manner that was not allowing for a stable connection.

Figure 11A:
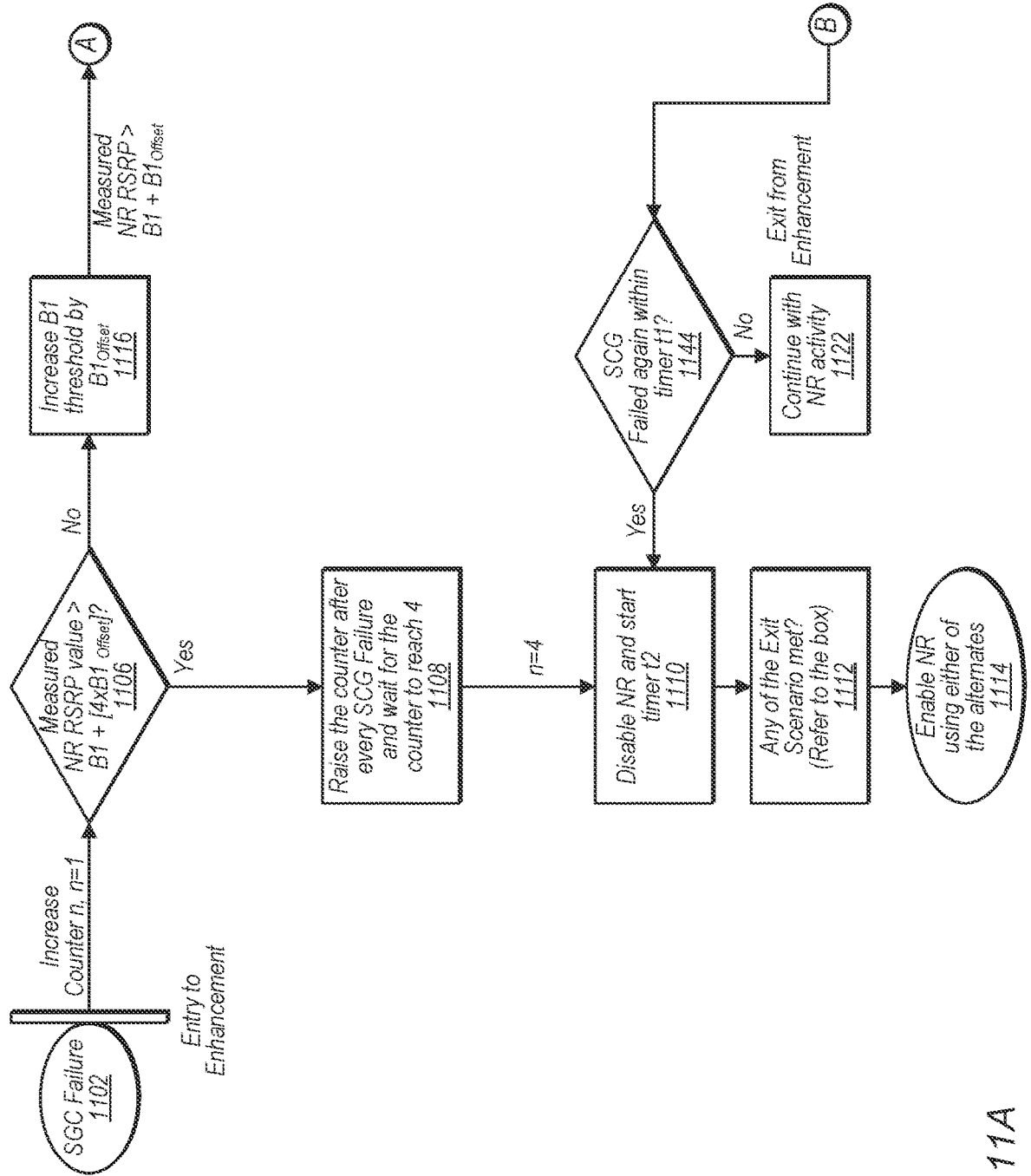
Figure 11B:
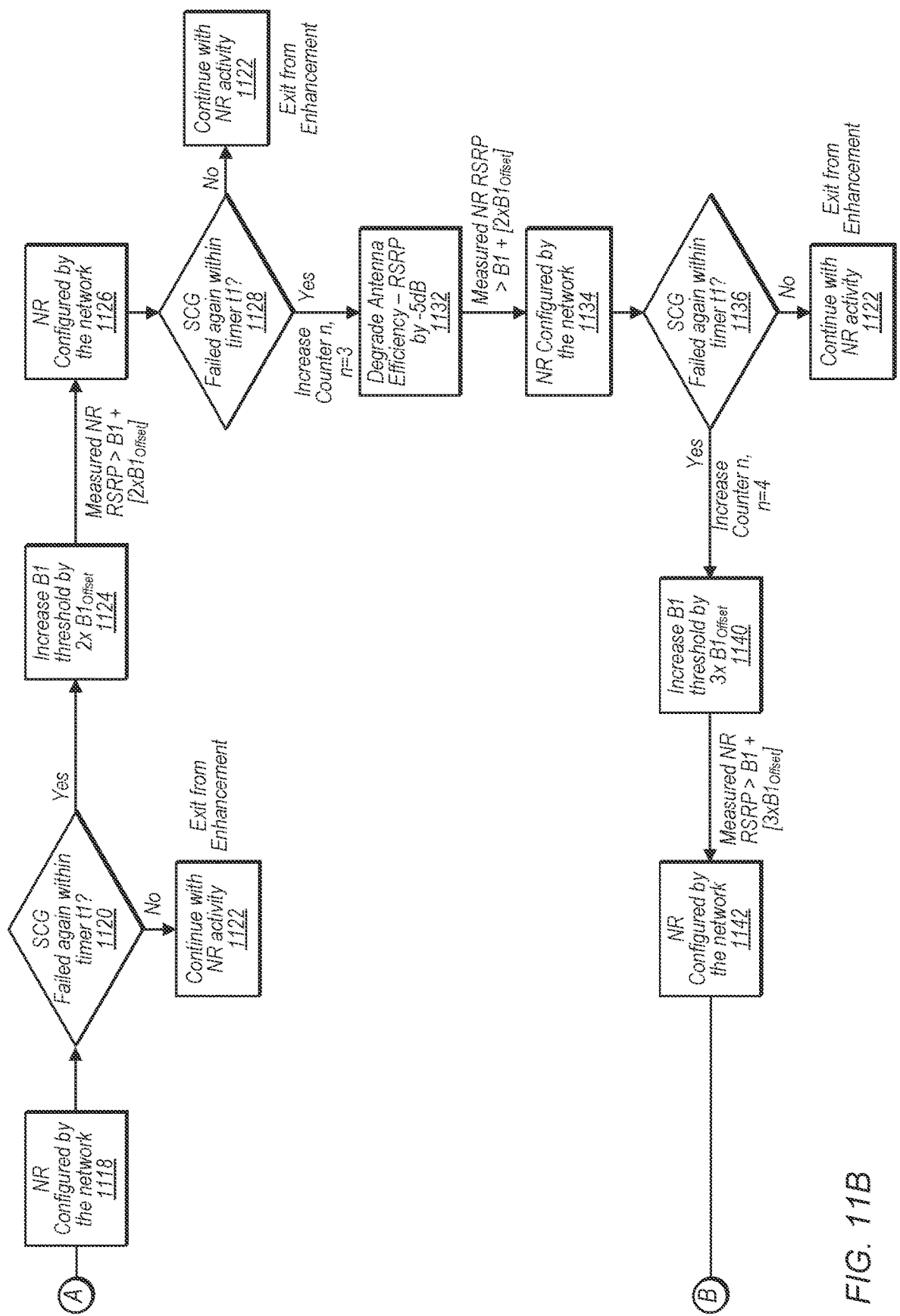

FIGS. 11A-11B—Mitigation of Multiple SCG Failures

FIGS. 11A-11B illustrate exemplary techniques for mitigation of multiple secondary cell failures. In particular, the flowchart shown in FIGS. 11A and 11B illustrate exemplary embodiments corresponding to the method of FIG. 10. Note that while FIGS. 11A-11B may refer to secondary cells or a secondary cell group, the embodiments may apply to small cells, NR cells, etc. Additionally, while specific values or terms are used in these Figures, they are exemplary only and are not intended to limit the scope of the embodiments described herein. For example, descriptions related to specific counter thresholds, offset values, signal quality measurements, etc. may be varied according to different embodiments.

Aspects of the method of FIGS. 11A-11B may be implemented by a wireless device, such as the UE(s) 106, in communication with a network, e.g., via one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 302, baseband processor(s), processor(s) associated with communication circuitry, etc., among various possibilities) may cause the UE to perform some or all of the illustrated method elements. Similarly, one or more processors (or processing elements) of the BS (e.g., processor(s) 404, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

In 1102, when a UE experiences a SCG failure, this enhancement may be performed. As shown, after the SCG failure, a failure counter may be increased to 1 to n=1, and trigger a timer t1 (e.g., with a timer value of t1=180 sec or another value, as desired).

At 1106, the UE may determine if the NR secondary cell RSRP value exceeds the B1 threshold plus four times the value of a B1 offset (e.g., similar to the offset described above).

In 1108, if the measured RSRP is greater than or equal to (B1+4×B1Offset), then in 1108, the UE may be configured to send the NR measurement report as usual, and raise the counter n if the UE experiences a SCG failure, e.g., within the t1 timer that may be reset upon each failure.

In 1110, once the counter reaches n=4 based on more SCG failures, the UE may disable NR secondary cells using any of the various embodiments described above. For example, the UE may trigger a TAU with DCNR bit set to 0 to disable 5G and begin a timer t2.

However, if in 1106 the measured NR RSRP is less than B1+4×B1Offset, then in 1116, the UE may not send the measurement report (MR) for NR cell until measured RSRP reaches B1+B1 Offset.

In 1118, once NR is configured again (upon sending a MR when the NR cell RSRP reaches B1+B1Offset), and SCG failure is seen a second time in 1120, then in 1124, the counter may be increased by 1 to n=2 and the UE may not send another MR for NR cell until measured RSRP reaches B1+[2×B1Offset]. However, if the SCG does not fail within t1 in 1122, then normal NR activity may be resumed in 1122.

When measured NR RSRP is greater than B1+2× B1Offset, NR may be configured by the network in 1126.

In 1128, if SCG failure is seen third time within t1, the counter may be increased by 1 to n=3 and in 1132 the antenna efficiency may be degraded such that measured RSRP is degraded by 5 dB. Note that this step is optional (e.g., instead the offset could be changed) and/or could be performed at a different point in the flowchart (e.g., later, when n reaches 5). In some embodiments, degrading the antenna efficiency may be performed for a particular band (e.g., an NR band), which may allow the B1 threshold to be met to add the NR cell and avoid SCG failure. In some embodiments, the antenna efficiency may be degraded by changing the antenna tuner value, e.g., by changing the tuner value for B2 (e.g., B2+n71).

However, if the SCG does not fail within t1 in 1128, then normal NR activity may be resumed in 1122.

In 1134, after antenna efficiency is degraded, when the measured NR RSRP reaches B1+[2×B1Offset], NR may be configured again, e.g., in response to a measurement report from the UE.

In 1136, if SCG failure is seen fourth time within t1, the counter may be increased by 1 to n=4, and in 1140, the B1 threshold may be increased by 3×B1offset. However, if SCG does not fail within t1, NR activity may be continued in 1122.

In 1140, the UE may not send the measurement report for NR cell until measured RSRP reaches B1+[3×B1Offset].

In 1142, upon sending the measurement report, NR may be configured again by the network.

In 1144, if SCG failure is seen a fifth time, the counter may be increased by 1 to n=5, and NR may be disabled in 1110 as discussed above. However, if SCG does not fail within t1, NR activity may be continued in 1122.

After disabling in 1110, in 1112, if any of the exit criteria are met (e.g., such as those described above in relation to FIG. 10), then NR may be enabled in 1114, using any of the re-enabling techniques described herein (e.g., also described above in relation to FIG. 10).

EXEMPLARY EMBODIMENTS

The following descriptions provide exemplary embodiments corresponding to various embodiments described herein, e.g., such as corresponding to the method of FIGS. 10-11B.

Example 1. An apparatus, comprising: one or more processors, configured to cause a user equipment device (UE), to: establish communication with a first base station, wherein the first base station comprises a macro cellular base station; perform a first signal quality measurement of a second base station, wherein the second base station is a small cell base station; compare the first signal quality measurement to a first threshold; based on the first signal quality measurement exceeding the first threshold, attempt to connect to the second base station; in response to a first radio link failure of the second base station, modify the first threshold; perform a second signal quality measurement of the second base station; compare the second signal quality measurement to the modified first threshold; based on the second signal quality measurement exceeding the first threshold, attempt to connect to the second base station; and in response to a second radio link failure of the second base station, disable connections to the second base station.

Example 2. The apparatus of example 1, wherein the second base station comprises a new radio (NR) base station, and wherein disabling connections to the second base station comprises disabling connections to NR base stations.

Example 3. The apparatus of example 2, wherein establishing communication with the first base station comprises providing UE capability information, wherein the UE capability information indicates NR capability; wherein said disabling connections to the second base station comprises providing updated UE capability information, wherein the updated UE capability information does not indicate NR capability.

Example 4. The apparatus of example 3, wherein providing updated UE capability information is provided to the first base station.

Example 5. The apparatus of example 3, wherein providing updated UE capability information is provided to a mobility management entity (MME) associated with the first base station.

Example 6. The apparatus of example 1, wherein the one or more processors are further configured to: modify the first threshold one or more additional times; perform one or more additional signal quality measurements; and detect one or more additional failures; wherein said disabling connections to the second base station is based on detecting the one or more additional failures.

Example 7. The apparatus of example 6, wherein the one or more processors are further configured to: increment a counter for each failure within a first time period of a previous failure; wherein said disabling connections to the second base station is based on the counter exceeding a counter threshold.

Example 8. The apparatus of example 1, wherein the one or more processors are further configured to: re-enable connections to the second base station based on one or more criteria.

Example 9. The apparatus of example 8, wherein the one or more criteria includes a timer reaching a threshold value after disabling connections to the second base station.

Example 10. The apparatus of example 8, wherein the one or more criteria includes detecting a change in motion state of the UE.

Example 11. A user equipment (UE), comprising: wireless communication circuitry; and one or more processors coupled to the wireless communication circuitry, wherein the one or more processors are configured to cause the UE to: establish communication with a first base station, wherein the first base station comprises a long term evolution (LTE) base station, wherein establishing communication with the first base station includes providing UE capability information indicating NR capability; perform a first signal quality measurement of a second base station, wherein the second base station is new radio (NR) base station; compare the first signal quality measurement to a first threshold; based on the first signal quality measurement exceeding the first threshold, attempt to connect to the second base station; in response to a first radio link failure of the second base station, modify the first threshold using a first threshold offset; perform a second signal quality measurement with the second base station; compare the second signal quality measurement to the modified first threshold; based on the second signal quality measurement exceeding the first threshold, attempt to connect to the second base station; and in response to a second radio link failure of the second base station, disable connections to NR base stations, including the second base station, wherein said disabling connections to the second base station comprises providing updated UE capability information, wherein the updated UE capability information does not indicate NR capability.

Example 12. The UE of example 11, wherein the one or more processors are further configured to: receive configuration information from the first base station specifying the first threshold; and provide a measurement report to the first base station in response to the first signal quality measurement exceeding the first threshold, wherein attempting to connect to the second base station is performed in response to a handover command from the first base station.

Example 13. The UE of example 1, wherein the one or more processors are further configured to: modify the first threshold one or more additional times; perform one or more additional signal quality measurements; and detect one or more additional failures; wherein said disabling connections to the second base station is based on detecting the one or more additional failures.

Example 14. The UE of example 1, wherein the one or more processors are further configured to: re-enable NR connections, including to the second base station, based on one or more criteria.

Example 15. An apparatus, comprising: one or more processors, configured to cause a first base station, to: establish communication with a user equipment (UE); receive UE capability information from the UE, wherein the UE capability information indicates new radio (NR) capability; receive a measurement report from the UE, wherein the measurement report indicates signal quality of a NR base station exceeds a first threshold; provide a handover command to the UE to handover or additionally connect to the NR base station; in response to a plurality of handover failures by the UE to connect to the NR base station, receive updated UE capability information from the UE, wherein the updated UE capability information removes NR capability.

Example 16. The apparatus of example 15, wherein the one or more processors are further configured to: provide configuration information to the UE, wherein the configuration information specifies the first threshold.

Example 17. The apparatus of example 15, wherein receiving updating UE capability information comprises: receiving a tracking area update message from the UE, wherein the tracking area update message indicates a UE capability change flag; providing a UE capability enquiry message to the UE in response to the tracking area update message.

Example 18. The apparatus of example 17, wherein the UE capability information includes one or more information elements indicating NR capability, wherein the updated UE capability information does not include the one or more information elements indicating NR capability.

Example 19. The apparatus of example 15, wherein the one or more processors are further configured to: at a later time, receive second UE capability information from the UE, wherein the second UE capability information indicates NR capability.

Example 20. The apparatus of example 19, wherein the one or more processors are further configured to: in response to a new measurement report after the receiving the second UE capability information, provide a command to the UE to handover or additionally connect to an NR base station.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

In some embodiments, a device includes: an antenna; a radio coupled to the antenna; and a processing element coupled to the radio. The device may be configured to implement any of the method embodiments described above.

In some embodiments, a memory medium may store program instructions that, when executed, cause a device to implement any of the method embodiments described above.

In some embodiments, an apparatus includes: at least one processor (e.g., in communication with a memory), that is configured to implement any of the method embodiments described above.

In some embodiments, a method includes any action or combination of actions as substantially described herein in the Detailed Description and claims.

In some embodiments, a method is performed as substantially described herein with reference to each or any combination of the Figures contained herein, with reference to each or any combination of paragraphs in the Detailed Description, with reference to each or any combination of Figures and/or Detailed Description, or with reference to each or any combination of the claims.

In some embodiments, a wireless device is configured to perform any action or combination of actions as substantially described herein in the Detailed Description, Figures, and/or claims.

In some embodiments, a wireless device includes any component or combination of components as described herein in the Detailed Description and/or Figures as included in a wireless device.

In some embodiments, a non-volatile computer-readable medium may store instructions that, when executed, cause the performance of any action or combination of actions as substantially described herein in the Detailed Description and/or Figures.

In some embodiments, an integrated circuit is configured to perform any action or combination of actions as substantially described herein in the Detailed Description and/or Figures.

In some embodiments, a mobile station is configured to perform any action or combination of actions as substantially described herein in the Detailed Description and/or Figures.

In some embodiments, a mobile station includes any component or combination of components as described herein in the Detailed Description and/or Figures as included in a mobile station.

In some embodiments, a mobile device is configured to perform any action or combination of actions as substantially described herein in the Detailed Description and/or Figures.

In some embodiments, a mobile device includes any component or combination of components as described herein in the Detailed Description and/or Figures as included in a mobile device.

In some embodiments, a network node is configured to perform any action or combination of actions as substantially described herein in the Detailed Description and/or Figures.

In some embodiments, a network node includes any component or combination of components as described herein in the Detailed Description and/or Figures as included in a mobile device.

In some embodiments, a base station is configured to perform any action or combination of actions as substantially described herein in the Detailed Description and/or Figures.

In some embodiments, a base station includes any component or combination of components as described herein in the Detailed Description and/or Figures as included in a mobile device.

In some embodiments, a 5G NR network node or base station is configured to perform any action or combination of actions as substantially described herein in the Detailed Description and/or Figures.

In some embodiments, a 5G NR network node or base station includes any component or combination of components as described herein in the Detailed Description and/or Figures as included in a mobile device.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
a radio; and
one or more processors, operably coupled to the radio and configured to cause the UE, to:
establish communication with a first cell of first base station, wherein the first cell is in a master cell group (MCG);
receive first signaling from the first base station configuring the UE to perform signal quality measurements of a second cell of a second base station, wherein the first signaling includes a first threshold;
perform first signal quality measurements of the second cell;
compare the first signal quality measurement to the first threshold;
based on the first signal quality measurement exceeding the first threshold and without further instruction, autonomously attempt to add a connection to the second base station via the second cell as a part of a second cell group (SCG) for dual connectivity (DC);
in response to failing to add the connection to the second base station, modify the first threshold;
perform a second signal quality measurement of the second base station;
compare the second signal quality measurement to the modified first threshold;
based on the second signal quality measurement exceeding the modified first threshold, autonomously attempt to connect to the second base station; and
in response failing to connect to the second base station, disable connections to the second base station.

2. The UE of claim 1, wherein the first signal quality measurements include one or more of reference signal received power (RSRP), reference signal received quality (RSRQ), and signal to interference and noise ratio (SINR).

3. The UE of claim 1, wherein the second cell operates according to a new radio (NR) radio access technology.

4. The UE of claim 1, wherein the first cell operates according to a long term evolution (LTE) radio access technology.

5. The UE of claim 4, wherein the one or more processors are further configured to cause the UE to:
indicate to the first cell that the UE is capable of performing dual connectivity.

6. The UE of claim 1, wherein the first threshold is a B1 threshold.

7. The UE of claim 1, further comprising a display.

8. A method, comprising:
at a user equipment device (UE), to:
establishing communication with a first cell of first base station, wherein the first cell is in a master cell group (MCG);
receiving first signaling from the first base station configuring the UE to perform signal quality measurements of a second cell of a second base station, wherein the first signaling includes a first threshold;
performing first signal quality measurements of the second cell;
comparing the first signal quality measurement to the first threshold;
based on the first signal quality measurement exceeding the first threshold and without further instruction, autonomously attempting to add a connection to the second base station via the second cell as a part of a second cell group (SCG) for dual connectivity (DC);
in response to failing to add the connection to the second base station, modifying the first threshold;
performing a second signal quality measurement of the second base station;
comparing the second signal quality measurement to the modified first threshold;
based on the second signal quality measurement exceeding the modified first threshold, autonomously attempting to connect to the second base station; and
in response failing to connect to the second base station, disabling connections to the second base station.

9. The method of claim 8, wherein the first signal quality measurements include one or more of reference signal received power (RSRP), reference signal received quality (RSRQ), and signal to interference and noise ratio (SINR).

10. The method of claim 8, wherein the second cell operates according to a new radio (NR) radio access technology.

11. The method of claim 8, wherein the first cell operates according to a long term evolution (LTE) radio access technology.

12. The method of claim 8, wherein the first threshold is a B1 threshold.

13. A processor comprising memory configured to cause the processor to perform operations comprising:
- establishing communication with a first cell of first base station, wherein the first cell is in a master cell group (MCG);
- receiving first signaling from the first base station configuring a user equipment (UE) to perform signal quality measurements of a second cell of a second base station, wherein the first signaling includes a first threshold;
- performing first signal quality measurements of the second cell;
- comparing the first signal quality measurement to the first threshold;
- based on the first signal quality measurement exceeding the first threshold and without further instruction, autonomously attempting to add a connection to the second base station via the second cell as a part of a second cell group (SCG) for dual connectivity (DC);
- in response to failing to add the connection to the second base station, modifying the first threshold;
- performing a second signal quality measurement of the second base station;
- comparing the second signal quality measurement to the modified first threshold;
- based on the second signal quality measurement exceeding the modified first threshold, autonomously attempting to connect to the second base station; and
- in response failing to connect to the second base station, disabling connections to the second base station.

14. The processor of claim 13, wherein the first signal quality measurements include one or more of reference signal received power (RSRP), reference signal received quality (RSRQ), and signal to interference and noise ratio (SINR).

15. The processor of claim 13, wherein the second cell operates according to a new radio (NR) radio access technology.

16. The processor of claim 13, wherein the first cell operates according to a long term evolution (LTE) radio access technology.

17. The processor of claim 13, wherein the first threshold is a B1 threshold.

18. The processor of claim 13, the operations further comprising indicating to the first cell that the UE is capable of performing dual connectivity.

* * * * *